(12) United States Patent
Baluja et al.

(10) Patent No.: US 8,379,828 B2
(45) Date of Patent: Feb. 19, 2013

(54) FLEXIBLE COMMUNICATION SYSTEMS AND METHODS

(75) Inventors: Shumeet Baluja, Leesburg, VA (US); Michael Chu, Los Altos Hills, CA (US); Mayumi Matsuno, Seattle, WA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/234,834

(22) Filed: Sep. 16, 2011

(65) Prior Publication Data

US 2012/0002640 A1 Jan. 5, 2012

Related U.S. Application Data

(63) Continuation of application No. 11/688,145, filed on Mar. 19, 2007, now Pat. No. 8,036,367.

(51) Int. Cl.
G09F 17/60 (2006.01)
(52) U.S. Cl. .................... 379/221.02; 705/26.1
(58) Field of Classification Search .................... 455/432
See application file for complete search history.

(56) References Cited

U.S. PATENT DOCUMENTS

| | | | |
|---|---|---|---|
| 5,479,411 A | 12/1995 | Klein | |
| 6,363,251 B1 * | 3/2002 | Huang et al. | 455/432.1 |
| 6,381,315 B1 * | 4/2002 | Nhaissi | 379/111 |
| 7,076,447 B1 * | 7/2006 | Peyser et al. | 705/26.2 |
| 7,548,976 B2 * | 6/2009 | Bahl et al. | 709/226 |
| 7,885,654 B2 | 2/2011 | Fadell | |
| 2002/0046166 A1 | 4/2002 | Kitchen et al. | |
| 2002/0061013 A1 | 5/2002 | Yoshida et al. | |
| 2002/0111915 A1 | 8/2002 | Clemens et al. | |
| 2002/0138398 A1 * | 9/2002 | Kalin et al. | 705/37 |
| 2002/0169716 A1 | 11/2002 | Johnson et al. | |
| 2004/0246920 A1 | 12/2004 | Savolainen | |
| 2005/0022001 A1 | 1/2005 | Bahl et al. | |
| 2006/0056353 A1 | 3/2006 | McBride | |
| 2006/0083171 A1 | 4/2006 | Tanaike et al. | |
| 2007/0008926 A1 | 1/2007 | Oba | |

FOREIGN PATENT DOCUMENTS

| | | |
|---|---|---|
| JP | 2004/064208 | 2/2004 |
| JP | 2005/192163 | 7/2005 |
| JP | 2006/246409 | 9/2006 |
| WO | WO 02/41580 | 5/2002 |
| WO | WO 2004/047476 | 6/2004 |
| WO | WO2004/047476 | 6/2004 |

OTHER PUBLICATIONS

International Preliminary Report on Patentability for Application No. PCT/US2008/057507, dated Oct. 1, 2009, 11 pages.

Erich Bircher et al.: "An Agent-Based Architecture for Service Discovery and Negotiation in Wireless Networks" Wired/Wireless Internet Communications; [Lecture Notes in Computer Sciences; LNCS], Springer-Verlag, Berlin/Heidelberg, vol. 2957, Jan. 21, 2004.

(Continued)

*Primary Examiner* — George Eng
*Assistant Examiner* — Joseph Dean, Jr.
(74) *Attorney, Agent, or Firm* — Fish & Richardson P.C.

(57) ABSTRACT

A method of initiating a telecommunication session for a communication device include submitting to one or more telecommunication carriers a proposal for a telecommunication session, receiving from at least one of the one or more telecommunication carriers a bid to carry the telecommunications session, and automatically selecting one of the telecommunications carriers from the carriers submitting a bid, and initiating the telecommunication session through the selected telecommunication carrier.

26 Claims, 8 Drawing Sheets

OTHER PUBLICATIONS

'AppleInsider.' "Apple granted patent where carriers bid to provide service to iPhones," 2011, [retrieved on Jan. 26, 2012]. Retreived from the Internet: URL: <http://www.appleinsider.com/articles/11/02/09/apple_granted_patent_where_carriers_bid_for_iphone_service.html>. 6 pages.

Duan et al. "Competition with Dynamic Spectrum Leasing." Academic Paper, Department of Information Engineering, the Chinese University of Hong Kong, 2010, 18 pages.

Katz et al. "A Revolutionary Confederated Service Architecture for Future Telecommunications Systems." Program Proposal, University of California, Mar. 13, 2001, 23 pages.

Chinese Office Action in Chinese Application No. 200880016647.6, dated Apr. 5, 2012, 5 pages.

Japanese Office Action in Japanese Application No. 2009/554712, dated Oct. 16, 2012, 5 pages.

* cited by examiner

FLEXIBLE COMMUNICATION SYSTEMS AND METHODS

CROSS-REFERENCE TO RELATED APPLICATIONS

This application is a continuation of and claims priority under 35 U.S.C. §120 to U.S. application Ser. No. 11/688,145, filed on Mar. 19, 2007, the entire contents of which are hereby incorporated by reference.

TECHNICAL FIELD

This document relates to voice and data communications, and more particularly to devices, systems, and methods for providing various forms of communication in a variety of manners.

BACKGROUND

Telecommunications are extremely important to businesses and individuals. People need to communicate with others at a distance for a variety of reasons and in a variety of ways. For example, people need to talk to each other, whether for personal reasons or business, and many people are wedded to their telephones—their connections to the world. At other times, people need to see each other, and can use videoconferencing to connect over a distance. People also sometimes need to contact emergency services, such as through 911 calls. Written communication may also occur, such as via e-mail or text messaging. People also need access to information apart from their communications with other people. For example, many people depend on the World Wide Web to access all kinds of important (and less-than-important) information.

As each new communication technology matures, and as more technologies are developed, users begin to see each technology as simply another application. And they depend less-and-less on the mode in which the communication is carried. For example, voice melds into data, as users desire to send and receive files and other materials during a discussion—or to work on a virtual whiteboard during a meeting. Also, with the ability to digitize voice, telephone calls become simply another form of data—albeit with a relatively high quality of service (QoS) requirement.

However, users still struggle to unify their communications. For example, a user may have a wired voice telephone connection at home, with the addition of a wired (e.g., DSL or cable) data connection. They may also use a cellular telephone for voice access, and an additional device such as a personal digital assistant (PDA) for data access. And they may have a different provider for each of these services, even though, to the user, they are just communications applications and not much more.

Some attempts have been made to simplify communications. For example, applications have been developed by which a telephone works as a cordless device on a landline connection when within range of a base station in the home, but as a wireless cellular telephone when out of range. Generally, however, such a system is limited in the services it may provide and the way in which it can provide them. For example, a user may be restricted to a particular plan or particular provider of telecommunication access. The user may be indifferent to the mode of access, however, as long as the access meets a certain minimal level of quality. The user may instead be more interested in having access to numerous and superior applications, and may desire the freedom to use a variety of communication modes.

SUMMARY

This document describes devices, systems, and methods for providing telecommunication access and applications to users in a flexible manner. Devices may operate on multiple networks, and may in certain circumstances seek out bids from telecommunication service providers. For example, a device such as a mobile telephone may have the capability to operate over multiple different networks, including a home network when in the home, to transition to a metropolitan network when outside the home but in a higher-density area (urban/suburban), and transition to a more traditional cellular network when outside such a higher density area. The connections may, in appropriate circumstances, be provided by different telecommunications providers, and may involve hand-offs of a particular communication session from one provider to another.

In addition, to help provide the user with a level of service that best meets the user's needs (whether the need is based on cost, quality of service, bandwidth requirements, or some other criteria), a device may seek out potential service providers and obtain certain terms of service from them. The device may also select a particular provider to handle a session, and may cause the session to be carried out. Such actions may occur at various times, for example, at the onset of a session or in the middle of a session as a device moves from a high-density area to an area of lower density.

Such approaches may advantageously provide one or more features. For example, a device may be configured to operate using a least expensive option for communication at all times, and may start auctions with telecommunications providers to connect to the provider bidding with the lowest cost. As one example, when in a home, the device may use a broadband communication method for which the user already pays a fixed monthly rate. When the user leaves the house, they may be transferred to a metropolitan network, which may be part of the same plan as the home plan, with monthly pricing, with use-based pricing, or with free use supported by advertising. When the user exits the metropolitan area, where free or low-rate pricing may not be possible, the system and methods may permit the user to transfer to a pay-for-use network. In addition to cost as a factor in selecting appropriate telecommunications providers, users may opt for alternative auction models based on maximal bandwidth offered, best coverage/reliability, or some combination of options.

In addition, the user's device may operate as a data device—treating voice and data communications similarly as transmissions of packet data. In this way, the device takes on a greater role for the user—translating the user's needs into data that can be transmitted. Because the user controls the device, the user receives greater flexibility in deciding what applications they need or want. In addition, such generalizing of the communication channel permits more open development of devices and applications to be run on devices, because the transmissions are standardized, and any device that can format communications according to the standard will work. Thus, for example, such an approach permits more readily for the development of an open-source telephone or other communication device.

In one implementation described here, a method of initiating a telecommunication session for a communication device is described. The method comprises submitting to a plurality of telecommunication carriers a proposal to commence a telecommunication session, receiving from each of the plurality of telecommunication carriers a bid to carry the telecommunication session, and then selecting one of the telecommunications carriers and initiating the session over the selected telecommunication carrier. The proposal for a telecommunication session may be submitted by a portable communication device, or possibly, a central service that will negotiate with the telecommunication carriers on behalf of the portable device. Also the availability of the plurality of telecommunication carriers to the portable communication device may be determined. In some aspects, the telecommunication session may comprise a voice call. The session may also comprise a non-voice data transmission.

In some aspects, the automatic selection of one of the telecommunication carriers may comprise evaluation by the device of bid prices and quality indicators. The selection of one of the telecommunication carriers may also comprise selecting a carrier that submits a lowest bid. The method may additionally include submitting to a plurality of telecommunication carriers a proposal for a second telecommunication session, receiving from each of the plurality of telecommunication carriers a bid to carry the second telecommunications session, and automatically selecting one of the telecommunications carriers and initiating the second telecommunication session through the selected telecommunication carrier. The selection of the telecommunication carrier to use can be a user-determined process or can be selected automatically based on a user's preference criteria.

In addition, the method may include, before submitting or during submission of the proposal for a telecommunication session, determining whether the device can access alternative networks, and initiating a call over a non-carrier network if the device is within a non-carrier network. The non-carrier network may be an IP-based network, and the device may access the IP-based network through an access point. The access point may include, but is not limited to, an IEEE 802.16-compliant device or an IEEE 802.11-compliant device. The method may further include transferring the device to a second public access point during the telecommunication session. Moreover, the method may include transferring the device to a carrier during the telecommunication session.

In another implementation, a device for initiating a telecommunication session is disclosed. The device comprises an interface to wirelessly connect the device to a plurality of data communication providers, a processor configured to execute a plurality of applications stored in memory on the device, and a connection module in communication with the processor to obtain carrier pricing information and select a carrier for carrying at least a portion of a telecommunication session using the carrier pricing information. The connection module may obtain the carrier pricing information after receiving a request from a user of the device for the initiation of the telecommunication session. Also, the interface may be configured to perform data communication using any combination of wireless communication standards including GSM, CDMA, TDMA, IEEE 802.11, IEEE 802.16, and Bluetooth. The connection module may also include a signal monitor to determine the relative quality of different service providers around the device. The signal monitor may also be used to determine when a device is moving in or out of a particular area of service. In addition, GPS-like location technology may also be included in the device to provide precise location coordinates when requesting bids from service providers.

In some aspects, the device may include a voice module in communication with the processor for enabling voice communication on the device. The device may also include a bid confirmer to verify to a telecommunication connection coordinator parameters of a completed telecommunication session.

In yet another implementation, a computer program product for use in conjunction with a computerized communication device is disclosed. The product may comprise a computer readable storage medium and a computer program mechanism embedded therein with instructions for submitting to a plurality of telecommunication carriers a proposal for a first telecommunication session, receiving from each of the plurality of telecommunication carriers a bid to carry the first telecommunications session, and automatically selecting one of the telecommunications carriers and initiating the first telecommunication session through the selected telecommunication carrier.

The mechanism may also include instructions for determining the availability of the plurality of telecommunication carriers to the portable communication device. The telecommunication session may comprise a voice call, and the automatic selection of one of the telecommunication carriers may comprise evaluation by the device of bid prices and quality indicators. The computer program mechanism may further comprise instructions for submitting to a plurality of telecommunication carriers a proposal for a second telecommunication session, receiving from each of the plurality of telecommunication carriers a bid to carry the second telecommunications session, and automatically selecting one of the telecommunications carriers and initiating the second telecommunication session through the selected telecommunication carrier.

In addition, the computer program mechanism may comprise instructions for determining, before submitting the proposal for a first telecommunication session, whether the device can access a non-carrier network, and initiating a call over the non-carrier network if the device is within a non-carrier network. The mechanism may further comprise instructions for transferring the device to a second public access point during the telecommunication session. Moreover, the acts performed by the instructions may be performed as part of transferring the device to a carrier during the telecommunication session.

In yet another implementation, a method of coordinating telecommunications sessions from a plurality of carriers for a single device is disclosed. The method comprises receiving a first billing notice representing a communication session carrier by a first carrier for the device, and relating to an amount bid by the first carrier for a telecommunication session, receiving a second billing notice representing a communication session carrier by a first carrier for the device, and relating to an amount bid by the second carrier for a telecommunication session, and transmitting a signal indicative of an amount to be deducted from an account associated with the device, which amount corresponds to amounts associated with the first billing notice and the second billing notice. The method may further comprise transmitting signals indicative of amounts to be added to accounts associated with the first and second carriers, which amounts correspond to amounts associated with the first billing notice and the second billing notice, respectively.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
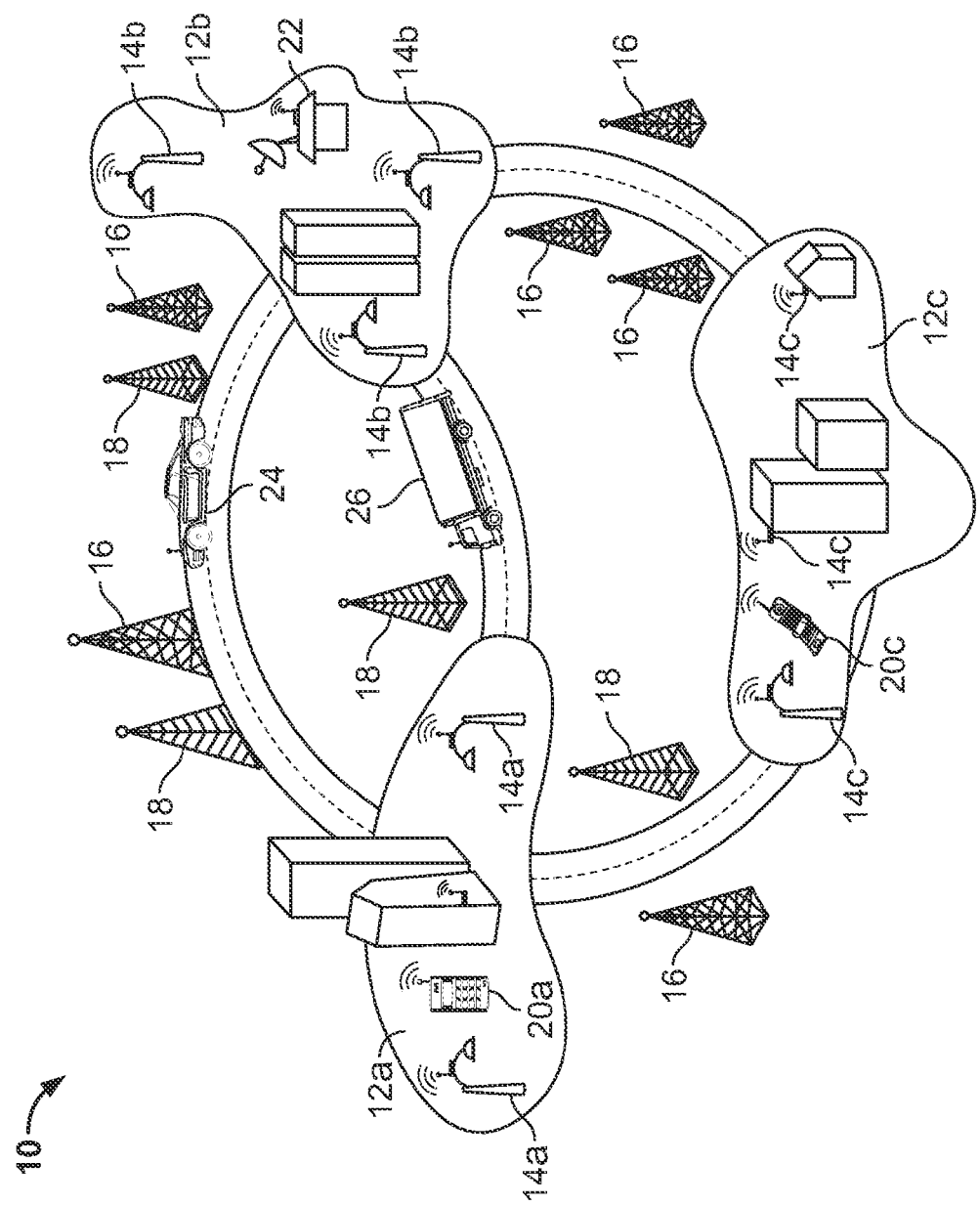
FIG. 1A is a diagram of a regional telecommunication system.

FIG. 1A is a diagram of a regional telecommunication system 10. The system spans across multiple urban communities, and across the rural areas between and among them. In general, within the system 10, telecommunication services may be provided by different subnets in the larger telecommunications network. For example, in urban areas where population is dense, services may be provided by cellular carriers in addition to alternative data networks such as WiFi or WiMAX and the like. Outside the urban areas, service will be more typically provided by cellular telephone providers. The systems may provide for "hand offs" within and between networks so as to permit constant or near-constant data or voice communications. Also, some or all of the communications may be treated as straight data communications, with voice being encoded and packetized at end user devices so as to be essentially indistinguishable from regular data on the network.

As shown, system 10 covers three communities that are provided with subnets 12a, 12b, 12c. These subnets 12a, 12b, 12c may include community-wide wireless data networks, such as WiFi, WiMAX, or other similarly configured networks. Within each subnet, there may be a number of wireless access points that connect to the subnet with a wire (e.g., a coaxial cable, optical fiber, etc.) and serve to permit users to access the subnet wirelessly (though ultimately through a wired connection). In addition, portions of a subnet may also be wired directly to a user.

The various subnets 12a, 12b, 12c may be public, private, or semi-private networks. For example, a public network may be a wireless network established for a city that may connect to the internet at a single point or multiple points, as is appropriate. The public network may be operated by a public agency such as a city, or may be operated by a private organization in cooperation with a public entity.

Also, a private network may be similar to the public network, and may be connected locally to the internet, but operated separately from any public organization (e.g., by a private internet service provider (ISP)). Such a network may also be connected to a more broad-based network, such as a regional network or a national network, such as by so-called peering points. For example, the private network may use dedicated communication channels purchased or leased by the private party, and/or may use communication channels for which the private party pays bulk usage fees. For communications between users of the private network, the general internet or other networks would not need to be used. Such an implementation may have the advantage of greater performance and less cost for the private network operator.

Various components may appear in each of the subnets 12a, 12b, 12c. For example, wireless devices such as personal digital assistant 20a and cellular telephone 20c may serve as communication endpoints. Also, wireless transceivers 14a, 14b, 14c may be placed on buildings or light poles to provide wireless connections for users near the transceivers. For example, transceivers on light poles may serve as simple repeaters that draw electrical power from the light poles or, for example, from solar collectors and related batteries. Other transceivers may be switches or routers that are wireless and wired, and thereby route data to and from the subnet's main connections to the internet or other central network(s). Cellular networks also have a similar topology whereby base stations provide a geographic footprint and connect into a larger network infrastructure.

The subnets 12a, 12b, 12c, as shown, presume that certain areas, such as urban areas, will be particularly amenable to full-coverage wireless data networks, while other rural areas will not. However, various areas may be joined in a variety of ways such that subnets may overlap and extend across multiple areas. The subnets may also be broken up as necessary, such that certain wireless access points are routed through a particular main line, while others are routed through another. In addition, the connections of the access points may be varied, such as automatically, to help balance the loads in a network or group of networks. For example, if data traffic is particularly heavy in one subnet, some of its access points may be alternatively connected via another subnet so as to ensure high quality service to each of subnets 12a, 12b, 12c.

Subnet 12b additionally includes a node 22 that may communicate with devices outside the subnet. For example, node 22 may be a satellite communication structure. In such an implementation, the satellite communication channel may be part of a private network, so that communications in the subnet are routed through node 22 for access to the rest of the private network or to other networks, including the internet.

Between the subnets 12a, 12b, 12c, are areas not covered by one of the subnets 12a, 12b, 12c, such as a rural area. Such areas may nonetheless be served by a cellular provider. Such service may be voice-based and/or data-based. As shown in the figure, there are two cellular communication providers, as shown by cell towers 16, 18 marked in different forms (e.g., one with crossed support girders and one with only horizontal girders). In some inter-subnet areas, both communication providers provide service, while in others, only one communication provider has service (as indicated by the presence of only one form of tower in the area). For example, in the middle of the figure, only the provider corresponding to tower 18 provides service. As such, users in this area will have to use that provider if they want to make a connection.

Likewise, along the top of the figure, both providers have multiple towers. Thus, for example, car 24 has two possible avenues available for telecommunications. Of course, where the providers have proprietary closed networks, the user may not be able to access the information through anything other than the provider network associated with a user's device or device identification. In such a situation, the closed network provider would lose out on the opportunity to carry the user's session. In any event, the operation of the cellular networks may follow any of a number of well-known modes of operation for connecting and billing calls.

In operation, in one example, a truck 26 travels from one subnet, 12b, to another, 12a. The area between these subnets is sparsely populated, and served only by a carrier associated with tower 18. If the user in the truck 26 starts a call inside subnet 12b, the call will be initiated by the subnet 12b and carried by the main line for the subnet 12b. As the user travels through the subnet 12b and moves out of the coverage of one access point, the handling of the call may be transferred to another access point. The hand-off may occur using known methods and methods described more completely below. Where the call is treated simply as a series of data transmissions containing digitized voice signals, each transmission may be treated independently, and the network simply needs to ensure that a particular group or packet of material is not sent through the network multiple times unnecessarily.

A different form of hand off can occur when the user exits subnet 12b. In this situation, the user may enter a network such as a cellular telephone network, operated by a different entity than the entity that operates subnet 12b, and/or a network that uses a different standard for communication than does the subnet 12b. For example, subnet 12b may use an IEEE-compliant wireless communication protocol, such as one of the variants of 802.11 or 802.16, while tower 18 may be part of a different network such as a GSM, UTMS, or CDMA network, among others. The hand-off between such networks may involve passing of identification information for billing or other usage tracking purposes. When the truck 26 reaches subnet 12a, a hand-off is performed from tower 18 to an access point in subnet 12a. Subnet 12a and subnet 12b may be operated by a single organization and be part of a single private network, or may alternatively be operated by various organizations and/or be parts of different networks, either connected through private networks or public networks such as the internet.

In another example, automobile 24 is traveling from subnet 12b to subnet 12a along a path served by multiple cellular carriers. The driver may have started in his or her home making a VoIP call with his or her home network, such as a WiFi or WiMAX network. The driver's device may be a multi-modal communication device capable of using multiple transmission protocols and transitioning transparently from one mode to another. For example, a call that is started in a home may occur using Unlicensed Mobile Access (UMA) technology, using, for example, Bluetooth or IEEE 802.11 standards.

When the driver leaves his or her home, the call may be picked up by subnet 12b, which itself may use UMA technology, but may be part of the same or a different subnet from what the user employs in his or her home. Where the phone call is digitized and treated like other data for transmission (perhaps with some preferential treatment to ensure QoS), each network may simply handle the packets as they are sent, and need not be concerned about what the packets are for, and what they will be when they are reassembled at the other end of the communication.

Once the driver in car 24 leaves subnet 12b, the job of handling data from the phone may shift to towers 16 or 18. Here, multiple cellular telephone carriers are available to handle the call, and such service may be provided based on an auction system. Specifically, and as described in more detail below, the user's device may identify itself to such carriers when it is within their range or in a certain area (e.g., as determined by GPS in the device and using data about coverage areas downloaded to the device). The device may also identify the communication session it is currently having, such as by providing identification of the device at the other end of the communication.

With this information, each carrier corresponding to towers 16 and 18, respectively, may offer a price for which it is willing to carry the communication session. Where the session is a telephone call, the bid may be in terms of a price per minute or other time period. Where the session is focused on data transmission, the bids may be in terms of bits or bytes of information, or a similar measure. Of course, voice transmission may, in appropriate circumstances, be treated as data transmission. A device may also obtain other information and make a decision on which carrier to accept based in whole or in part on such information. This information may include the expected quality of service, the broadest coverage (e.g., if the communication session is expected to take a long time and the user is moving), or the best trade-off as selected in a predetermined manner (such as a linear combination of two factors). A user may select a combination, such as by being provided with a graphical icon of a slider (or triangle or square) set out for two features (or three or four), and may position the slider between the two features in a manner showing a relative preference for one feature over the other.

The price bid by a carrier may be based in part on any fees the carrier may have to pay to another carrier. For example, when the user is calling another person who is on a landline, the wireless carrier may have to route the call through another carrier and pay that carrier a fee. In contrast, when the other person is on a network operated by the same company that operates subnet 12b (and the carrier has an agreement with that company), the carrier may be able to bid less for the communication session. Thus, a caller may be able to get a better deal based on who the "callee" has for a carrier—if that carrier also serves the area in which the caller is located. The quality of the session may likely be better in such an event also, because the call could stay within a single carrier's network.

The price may also be based on current network capacity or other factors relevant to the carrier. For example, if a carrier is approaching saturation for a particular part of a network, the carrier may produce very high bids or no bids at all so as to ensure better service on the network. The bid may also include various capabilities that the carrier has; for instance, one carrier may only be able to carry a voice call or a limited amount of data, while another carrier may be able to support a richer communication session such as a teleconference. In such a situation, the carrier capabilities may be made known in the bidding process so that the user or the user's device may make a more informed selection of carriers.

The carrier may also set a time limit for the bid, such that a user may send or receive data during the period set by the time limit, but then has to re-bid after that. For example, where a device initiates a bid during a low usage period, the carrier may make its bid "good" for one hour, after which the device will be set to re-bid. In this manner, carriers can better manage their loads and can also avoid providing low cost service during high demand periods. The time frame for bidding may be set dynamically by the carriers and made part of the bid, or may be set by prior agreement, e.g., with bids to expire at the top of each hour. Alternatively, bids may only apply to the existing request/session which would allow for an even more dynamic pricing.

Such sessions may be established by various appropriate approaches, including Session Initiation Protocol (SIP) for IP-based sessions and traditional approaches commonly associated with cellular based schemes. Such communication may employ a series of messages by which a caller device seeks to establish a session, and communicates that intent through intermediary devices such as servers, to a callee device. The callee device may likewise respond using messages, so that a session may be initiated and maintained.

These messages, though sent independently, are related as part of a transaction in a transaction protocol.

For example, user devices may be treated as agents, and may rely upon various network components to establish and carry on a communication session. In one example, an agent may initiate a call with the help of a proxy server. With such an approach, an intermediate device—a proxy server—may receive a message from a device and forward it across the network toward its intended target for the initiating user. For example, a device that wishes to initiate a session may send an INVITE message to a proxy server that includes a uniform resource identifier (URI) of a device with which communication is sought. The proxy server, after winning a bid for the session, may determine the location of the callee and forward the message. The callee device may respond, and the response may be forwarded by the proxy server to the caller. Such communications may occur, for example, using real-time transfer protocol (RTP) or other appropriate mechanisms. The servers may provide additional services, such as authentication and accounting.

In another example, an agent may initiate a call with the help of a redirect server. In such an example, a caller device may send an INVITE request to the redirect server, and the redirect server may contact a location server to determine the path to a callee. When this information is obtained, the redirect server may return the information to the caller device, the caller device may acknowledge that it has received the information, and it may send the request where the redirect server has indicated. This redirected location might indicate the callee device, or it might indicate another server that will forward the request. The callee may then respond and the caller may acknowledge the response.

A registrar server may track the location of various devices and provide such location information to other components in the network so that data intended for a particular device can be routed to the network and the location at which the device currently resides can be determined. The location of a device may be dynamically registered as the device moves, and may use location technologies such as AGPS, TDOA, cell-id and other known mechanisms, in concert with directory services such as finger, rwhois, and LDAP and other known mechanisms. In addition, device capabilities and handshaking to produce connections that match capabilities may be executed, for example, using SDP.

These descriptions of connections and communication mechanisms are intended to be exemplary only; other mechanisms and protocols may also be used as appropriate. For example, the H.323 standard or another standard may be used for communications, either as part of a SIP approach or otherwise. Also, sessions or portions of sessions may be organized and/or carried through the SS7 protocol, for call set-up, routing, control, management, and tear down. For the SIP example, the use of SIP is consistent with other features described below, which are end-to-end oriented, and place responsibility (and thus flexibility) on the end user devices.

Figure 1B:
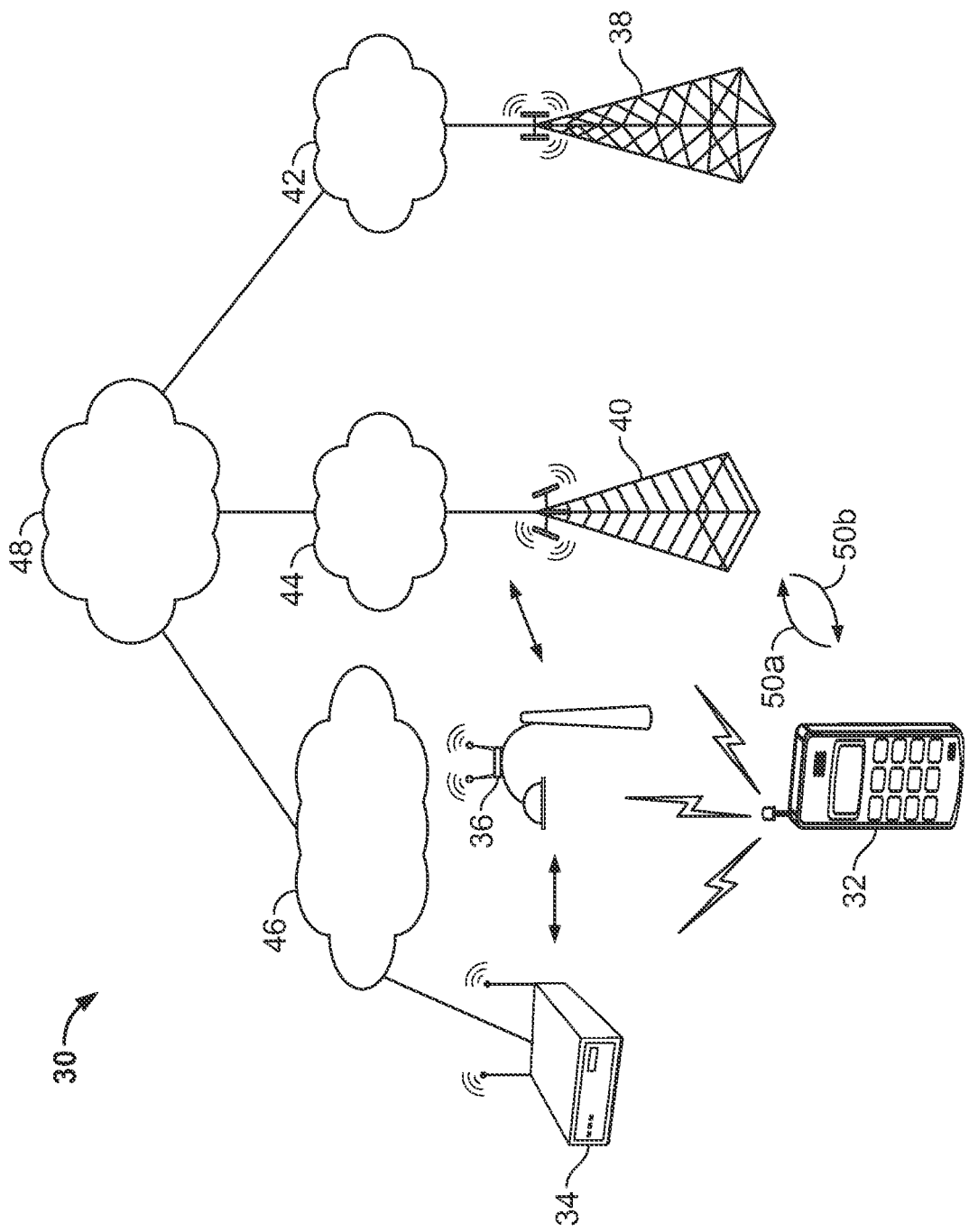
FIG. 1B is a diagram showing a mobile device communicating over multiple networks.

FIG. 1B is a diagram showing a mobile device 32 communicating over multiple networks 42, 44, 46, 48. In general, the figure shows how the device 32 may adjust its mode of communication depending on its location, so that its user may obtain the most effective communication at the lowest cost. The device 32 may initiate and end a communication session on a single network. In some implementations, the device 32 may initiate a communication session on one network, or using one access point for a network, and then may shift during the session to other access points or other networks.

As shown, device 32 may be any appropriate type of mobile device such as a cellular telephone, a smartphone, or a personal digital assistant. The device is capable of transmitting and receiving radio frequency (RF) signals in various modes or by various protocols. For example, the device 32 may communicate with a WiFi or similar switch 34 in a user's home. The switch 34 may in turn be connected, such as by standard broadband connection, to private network 46. The private network may be, for example, a network owned and operated by a single company or group of companies, for which access is restricted to users who have been qualified with the company or group of companies. Access to the network may be controlled, for example by user authentication (e.g., user name and password), or broader public access to the network may be provided.

Device 32 may also communicate with private network 46 via router 36 which may be a WiMAX-enabled network device that is part of a metropolitan-area network. Device 32 may be multi-modal, in that it may hand off from switch 34 to router 36 as the user moves, switching from 802.11 modes to 802.16 modes. The ultimate wired connection for either access point, however, will be to network 46. In addition, multiple access points may be provided in either the WiFi or the WiMax networks, and the device 32 may move from one access point to the next without changing modes also.

In addition, the device 32 may communicate with one or more cellular networks 42, 44, such as through access points 38, 40 at cellular towers. Cellular network 42 may be operated by a different carrier than is cellular network 44. The cellular networks 42,44 may also operate using different standards, or protocols. As shown by arrows 50a, 50b, the device 32 may enter exchange messages with access points 38, 40, such as when the device 32 enters the coverage zones of access points 38, 40, or when the device 32 senses that it is leaving the coverage zone of router 36, such as using a signal strength sensor.

The device 32 may, for example, transmit control signals at the frequency of one or more control channels for carriers known to be or suspected to be in a particular area. The frequencies may simply be a superset of all available frequencies and protocols. In addition, the device may be programmed to only attempt contact with networks known to be in a certain area (e.g., by comparing GPS location data obtained by the device 32 to a known map of carrier coverage). Arrows 50a, 50b represent requests from the device 32 and corresponding responses to the device in negotiating a connection.

Figure 2:
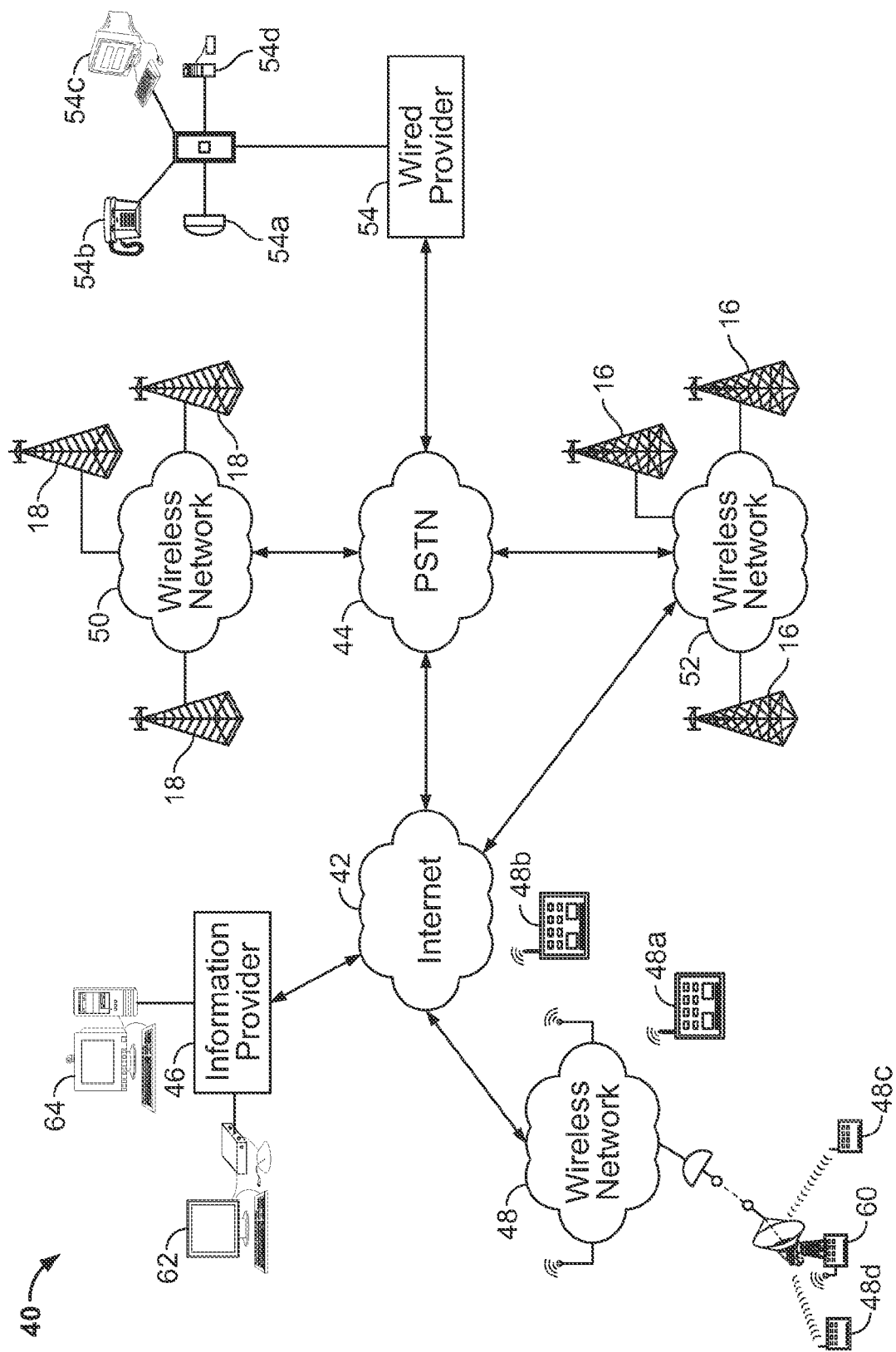
FIG. 2 is a system diagram showing the components of a telecommunications system.

Networks 42, 44 and network 46 may all be connected to public network 48, such as the internet and/or the public switched telephone network (PSTN). In this manner, a communication session may be maintained with another party connected to the network even as the device 32 moves geographically from one coverage area to the next. As shown, the hand offs as the device 32 moves may simply be from one access point to another on a single network, or may be from network to network FIG. 2 is a system diagram showing the components of a telecommunications system 40. The components may include or be similar to many of the components shown in FIGS. 1A and 1B. In general, the system 40 centers around two networks—the internet 42 and the public switched telephone network (PSTN) 44. In general, data communications may occur over the internet 42, while voice communications may occur over the PSTN 44. However, the PSTN 44 is also equipped to carry digital communications and could thus carry various forms of data, while the internet 42 may carry digitized voice communications, such as using various VoIP protocols or other mechanisms.

Various networks that provide a variety of services are shown connected to the internet 42 and PSTN 44. For example, a traditional wired provider 54, such as a competitive local exchange carrier (CLEC) may provide voice and data services through a switched network. The devices on the network may include traditional telephones 54a, 54b, 54d, and computer 54c. The computer 54c may communicate through traditional dial-up service or through DSL or other similar broadband services.

Information provider 46 may in turn provide access to internet 42. Information provider 46 may be, for example, a cable television company providing internet access through cable modems. As shown, computer 62 is connected to information provider 46 by a broadband cable connection and includes a microphone and speaker for carrying out telephone calls, such as by using VoIP. Likewise, computer 64 includes a monitor-mounted video camera for carrying video conferencing in a similar manner. Information provider 46 may also include other types of internet service providers, such as those who connect to users through wired provider 54 or other networks.

Traditional wireless network 50 may comprise a typical legacy cellular telephone transmission system having a number of towers 18, which may connect together via a commonly managed switching system. As shown, wireless network 50 is capable only of carrying voice communications between subscribers to the network, or with other users through PSTN 44.

Wireless network 52 is a more modern cellular network and includes both a voice channel and a distinct data channel (in addition to the basic control channel). Data transmissions are routed to, or received from, internet 42, while voice transmissions are routed to, or received from, PSTN 44.

Wireless network 48 is nominally an all-data network. Specifically, all data is packetized at clients and treated as data by the network. Prioritization may be provided for certain forms of continuous data, such as voice communications, however, to help ensure quality of service (QoS). Likewise, other data, such as HTTP-related data may also be packetized in a similar manner and routed similarly by the network, with assembly at the recipient or other appropriate point. In this way, wireless network 48 may provide full data services to its subscribers or other users.

In the figure, geographically separated portions of the network, in the form of transceiver 60, are shown separate from the wireless network 48. For example, the wireless network may have nodes in various population centers that may then be centrally connected to each other, such as by various broadband connections schemes, including fiber optic, dedicated fiber optic, microwave, and satellite connections. In this manner, device 48a and device 48b may conduct a data communication session, such as a VoIP telephone call in a single wireless network or LAN. Also, one or more (e.g., for a teleconference) of the devices may communicate with another device on wireless network 48 through transceiver 60, such as device 48c or device 48d.

Each communication through wireless network 48 may be a non-billed session so that users of the devices do not pay for the sessions, aside from what they would pay for a (monthly) subscription fee if wireless network 48 requires subscriptions. The communications may also be wholly free if wireless network 48 does not require any fees. Alternatively, wireless network 48 may be a hybrid network, in that various levels of service may be offered for various payment plans. For example, for higher fees, greater bandwidth or greater services may be provided. For example, at a lowest level, simple text messaging may be provided, while at a higher level, videoconferencing may be provided. Also, service may be made free or at a reduced rate where a user is willing to view promotional material while using wireless network 48.

Where communications occur in part outside wireless network 48, wireless network 48 may make connections with other networks in a standard fashion. For example, if a communication is a VoIP telephone call with computer 62, wireless network 48 may simply send the relevant packets to internet 42, which will route them appropriately.

Likewise, wireless network 48 may connect directly to PSTN 44 if a call is with a user of wired provider 54. In such a situation, wireless network 48 may transform the communication into one applicable to the PSTN 44, and may also follow other appropriate protocols for the PSTN 44, including billing and other protocols. For example, where the call is over a long distance, wireless provider 48 may have to pay connection and carrying fees to other providers that assist in making the connection. Wireless network 48 may reduce such fees, for example, by using identifying information about the out-of-network user to determine where the user is located, and then may use a private network or the internet 42 to route the information as close to that point as possible before passing it to PSTN 44. Wireless network 48 may also use other routing logic so as to minimize fees that it may have to pay to other providers.

Though termed a "wireless" network, wireless network 48 may have various wired components. For example, users may have wired, in addition to wireless, connections to the main network 48, and various subnets in the network 48 may be connected by wire.

As described more fully above and below, devices 48a-d may communicate within wireless network 48 as pure data devices such as using a VoIP protocol. Devices 48a-d may also travel outside wireless network 48 and gain access to other networks and providers, such as through an auction system. For example, device 48a may be carried to a network connected to information provider 46 and may connect itself as a data transmission device to communicate with the remainder of the networks. Device 48a may use a public VoIP provider such as Skype or Vonage to reach non-VoIP devices for voice communications. Likewise, device 48a may move out of the area of wireless network 48, and into the area of wireless network 52. Device 48a may then continue a communication or form a communication session through wireless network 52, as described more fully below.

Figure 3:
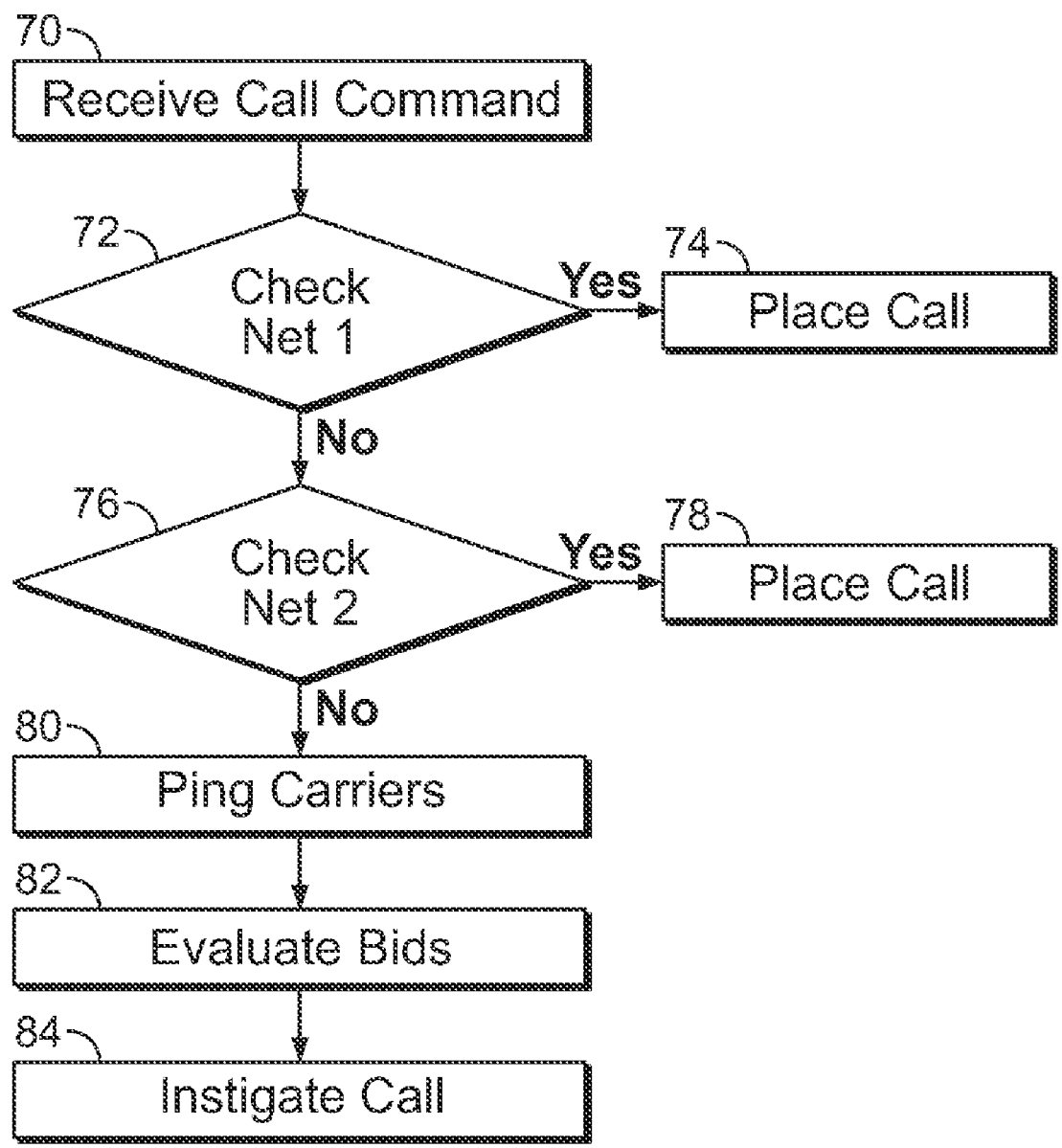
FIG. 3 is a flow chart showing actions by a communication device in instigating a voice telephone call.

FIG. 3 is a flow chart showing actions by a communication device in instigating a voice telephone call. This flowchart is generally for outgoing communications from a device. In general, a multi-modal device may be programmed to seek various modes of completing a communication session. As shown in the flowchart, the device starts with lowest cost options, and moves to higher cost options if the lower costs options are either unavailable or become unavailable.

At act 70, the device receives a call command, such as the entry by a user of a telephone number or similar destination identifier (e.g., a Gmail account identifier) and activation of a "send" or "call" command. The call command may also simply be part of a communication, such as a packet or group of packets of information. The device may initially check for availability of a first network (act 72), and if that network is available, the device may place the call or otherwise send data through the first network (act 74). The device may also have previously verified the availability of the first network, such as by periodically checking all available networks in the area. The first network may be, for example, a LAN in the user's home that connects through a wired broadband connection. Such a connection may provide high QoS at a negligible cost for the user.

If the first network is not available, such as when the user is outside their home, the device may then check for the availability of a second network (act 76), such as wireless network 48. If that network is available, the device may then complete the call or otherwise transmit the information (act 78). Other known networks may also be checked or otherwise determined to be available or unavailable.

The networks for which a device checks may be programmed into the device, such as when the device is purchased or through a training program for the device. For example, the second network may be programmed into the device by a vendor, whereas the first network may be "sniffed" out by the device when the user sets up their account, such as by operating the device in a particular mode in the user's home or office, where the user expects to most use the device, and knows that a wireless data network is available. The networks may also be "found" by the device in other manners, such as by dynamically updating the networks to use based on available networks currently around the device.

If no such data network is available to the device, it may then seek out out-of-network networks for which the user may have to pay a per-use fee (or may be shown promotional material in order to obtain access). As described in more detail with respect to FIGS. 4A and 4B, the device may ping any carriers within range (act 80) to indicate that it is in need of service. Before needing to ping the carriers, the device may have already determined which carriers are within range. The pinging process may involve transmitting identifying information and other information about a communication session, such as the type of data, amount of data, and expected bandwidth needed. Other information may also be provided.

Each carrier may then respond with a bid to carry the communication session. As noted above, the bid may follow a set form, such as a price for a predetermined and set time period (e.g., 20 minutes or to the top of the hour). Such restricted bidding may make comparison of the bids easier to complete, as the comparison may simply be price vs. price. The bidding may also be more open-ended, with each carrier having multiple variables (such as time or data volume, price, and level of service) that can be varied. The device may then evaluate any competing bids (act 82) and select the preferred bid for continuing the communication session. The device may take into account non-bid information such as the likely quality of service from a particular carrier or the bandwidth available from the carrier.

A user may set the rules for evaluating bids, such as by setting particular rules or by identifying a profile that is associated with particular rules. For example, a "power user" profile may choose the best connection available regardless of cost. As another example, a "student" profile may select lower quality or slower connections, and may also place a cap on offered prices. If all bids exceed such a cap, then the device may warn the user that he or she will not be able to continue a communication session if the user continues moving out-of-network. Profiles may allow a person to assign their account multiple different rules with a single selection or a limited number of selections.

Once a bid has been selected, the device may instigate the call or other communication session (act 84). This may involve starting a handoff process from one mode to another mode, such as by simultaneously communicating in both modes and removing redundant data during the overlap, such as through standard soft or softer handover techniques. The handover may also be a hard handover, if necessary. Another implementation may have a central platform that helps transition the service between two different networks. As described more fully below, the call may then continue at the negotiated rates until the user returns to an in-network area for a sufficiently long time so that the communication session may be handed back. The negotiation and handoff may be transparent to a user of the device. They may also be semi-transparent, so that the device provides some indication (such as audio or a visual display) that a communication session is moving out-of-network, and potentially starting to run a fee.

Figure 4A:
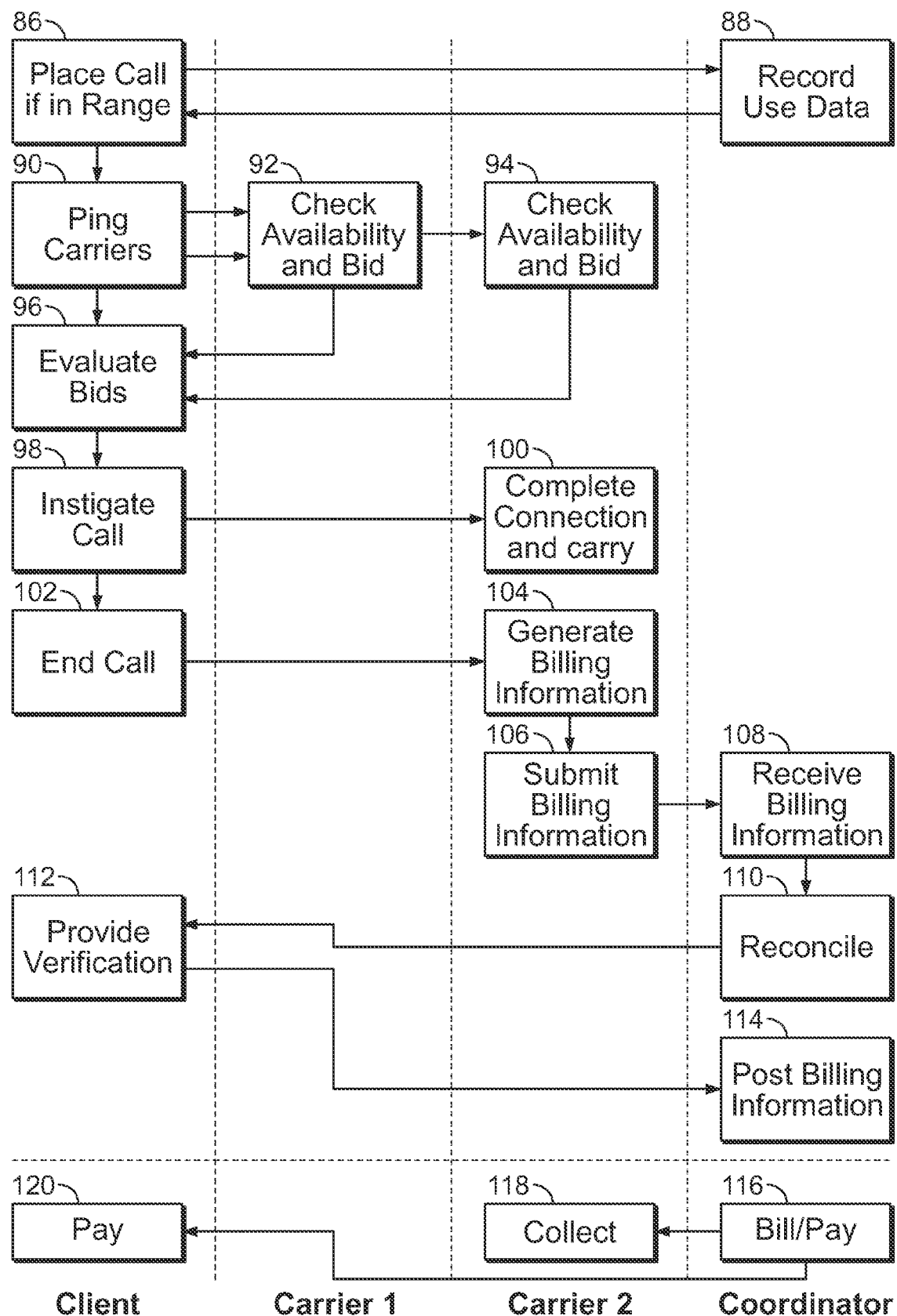
FIG. 4A is a swimlane diagram showing actions surrounding the provision of a data communication, such as a telephone call, from a communication device.

FIG. 4A is a swimlane diagram showing actions surrounding the provision of a data communication session, such as a telephone call, from a communication device. The chart shows in more detail the roles played by various players in the process. Here, the players are the client device, two carriers (e.g., carriers associated with towers 16 and 18 in FIG. 1), and a coordinator. The flowchart generally shows the instigation of a communication session, in the form of a telephone call.

As explained with respect to FIG. 3, a user's device will initially place a call over the service with which the device is primarily registered (act 86) if the device can do so. If the call is in-network for the entirety of the call, the coordinator may track and record use data (act 88). For example, the coordinator may track the start and end time of the call, along with the destination identifier (e.g., telephone number, gMail account, etc.). The information tracked may be the same as information currently tracked for traditional telephone calls using protocols such as SIP and SS7, and may also include different or additional information.

For example, where the communication is primarily data-based, the information may include a total file size of the communication session. The tracking of information may occur directly by the coordinator, such as by observing information passed onto the coordinator's network, where the coordinator operates the primary network for the user. The observation may also be indirect, such as by having the device track information about the communication session and then report it to the coordinator at the end of the session. Such an approach may be appropriate for an all-data device, as the coordinator may not be able to determine by simple observation when a communication session begins and ends—particularly if a device is simultaneously conducting two communication sessions (e.g., file transfer and telephone call). In addition, tracking may occur via third-parties which report information to a carrier associated with the caller and/or callee, such as by agreed-upon protocols.

If the primary network is not available, i.e., if the user is out-of-network, the device may then ping the available carriers as an invitation to bid (act 90). Carrier 1 may then take appropriate actions upon receiving the invitation, such as by verifying its current excess capacity, and may then compute a bid (act 92). Carrier 2 may take the same or similar actions (act 94). The device may then receive each of the bids and evaluate them using a predetermined rule or ruleset, and may select one of the carriers (act 96). The device may then instigate the call (act 98), such as by sending the information in a mode (e.g., appropriate frequency and appropriate protocol) for the selected bidder, and the selected bidder may carry the communication session, such as by routing the data and also making a connection to the destination device (act 100). Connecting the session may include traditional telephone switching through the PSTN network and/or providing information to a third party to carry out all or some of such switching.

When the call is over, the client device may end the call (act 102), such as when a user presses an end button on a telephone. Such an action may then cause the selected carrier to generate billing information for the call or other communication session (act 104). The generation of billing information may include interaction with the client device. For example, the device may track a parameter relevant to the billing, such as the length of a telephone call or the total number of bits or bytes transmitted and received, and may report such parameters to the selected carrier. The client device could even compute a price for the communication session, and simply report that price to the carrier. The carrier itself may also track information about the call, such as for billing purposes.

The selected carrier may then submit billing information to the coordinator (act 106) which may receive that information (act 108) and match it to an account for the client. The submission of billing information may occur as soon as the session is over, or may occur periodically (e.g., once each day or once each month). The billing information may include the date and time of the communication session, along with its length or the amount of data transferred, and the cost of the session.

In appropriate circumstances, and to "close the loop" on the transaction, the coordinator may reconcile (act 110) the transaction with the client, such as by locating the device when it is back in-network, so as to check that the client has matching information. In this manner, the system can ensure that inappropriate billing information is not submitted. If there is a match, the coordinator may post the billing information (act 114).

At an appropriate time, such as immediately after receiving billing information or monthly, the coordinator may institute a payment transaction (act 116) by which funds are obtained from the client (act 120) and funds are provided to the carrier (act 118). The transfers may occur simultaneously or one may occur before the other. The coordinator may also retain certain funds to cover transaction costs of carrying out the coordination of the communication session and its payment. In addition, various payment terms may be negotiated with carriers, e.g., payments may be reduced slightly if carriers are guaranteed payment and are paid immediately, before the users pay (e.g., the coordinator covers the "float").

In this example, the coordinator is a system or service with which the user of the client device has subscribed. The coordinator generally gathers all billing information for the client, combines it, handles the collection of payments from the client, and provides corresponding payments to various carriers. Payment may occur in traditional manners, such as by electronic banking, by credit card number, or by check. Payment may also occur via other electronic methods, such as micropayment methods in which the user maintains an electronically-accessible fund balance, and the system automatically accesses funds held by the user.

The coordinator may simply be a service or system that serves to organize transactions with carriers and take on the burden of locating users, and conduct billing and collecting from users. The coordinator may also be the same organization that provides a primary network for the user, such as a network using UMA technology. In addition, the coordinator may make and sell wireless devices for users, or may define a specification to which devices can be manufactured, including under license. Thus, the coordinator may provide a user with wired and wireless telecommunication access in particular areas, such as major urban and suburban areas, as a straight data service. Pricing for such a service may be provided for a low monthly rate, and may allow the user to perform any data-based activity with their device, such as e-mail, messaging, and voice communication.

The coordinator may allow the user to extend access out-of-network also. Data transmission may occur in particular out-of-network areas, and voice communication may also occur, either as a packetized data transfer or via typical cellular telephone communications (e.g., where the client device is capable from switching from one mode to another).

Figure 4B:
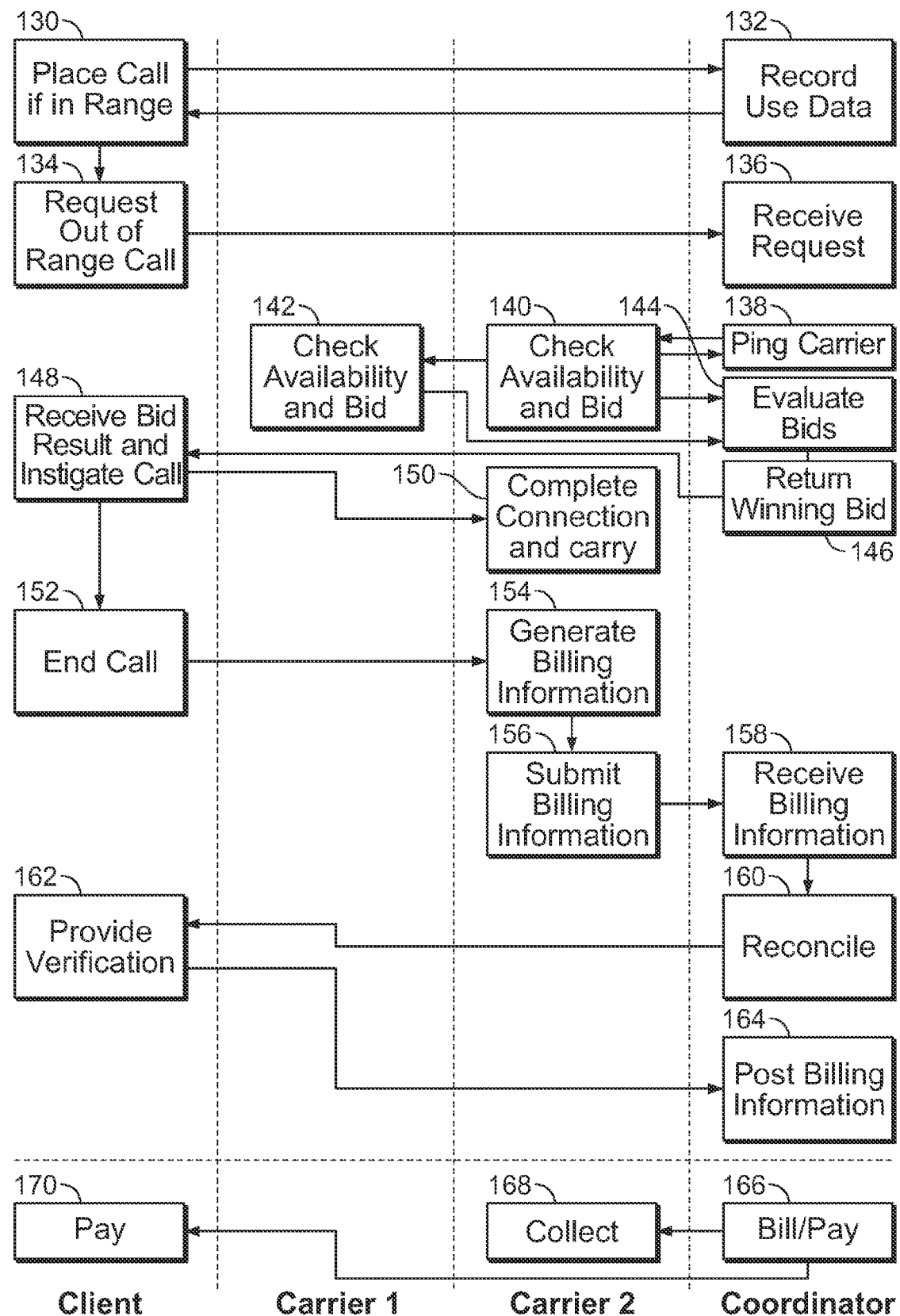
FIG. 4B is a swimlane diagram showing actions surrounding the provision of a data communication, such as a telephone call, from a communication device.

FIG. 4B is a swimlane diagram showing actions surrounding the provision of a data communication, such as a telephone call, from a communication device. This diagram is similar to that in FIG. 4A, except that the coordinator takes on a larger role in the bidding process. As with the prior example, the client device places a call with its primary network if it is in-network (act 130), and the coordinator may track and record use data for the communication session (act 132). If the device is out-of-network, the coordinator may receive a request by other means, such as through another network that agrees to forward such requests (act 134). Such a request may also be made when a device is moving from in-network to out-of-network, but before the device leaves the network. Such a determination may be made, for example, using signal strength data and the trend of signal strength, or by using location and vector data to determine that the device is leaving the network. The location determination may be made by the coordinator, by the device, or by a third party, and when it is made by the device, information about the network coverage may be periodically provided to the device so that it has an up-to-date network map.

When the coordinator has received the request (act 136), it may carry out an auction process by pinging various carriers which it knows have coverage for the area into which the client device is moving (act 138). The carriers may in turn respond with bids (acts 142, 142) and the coordinator may evaluate the bids (act 144). The evaluation may take into consideration a rule or ruleset specific to the client device or the user of the client device.

The coordinator may then identify the selected carrier to the client device (act 146) so that the client device may make a connection with that carrier and instigate the call (act 148). In this manner, the coordinator may serve as a redirect server. In return, the selected carrier may complete the call, as described above, until it is finished (acts 150, 152). Upon call completion (or other completion of a communication session), the selected carrier may generate billing information (act 154) and submit that information to the coordinator (act 158). As described above, the coordinator may then reconcile the transaction (act 160) by checking back with the client device, which may verify that the communication session occurred and that the submitted information about the session (e.g., length and/or cost) is correct (act 162). The coordinator may then post the billing information to accounts associated with the carrier and with the client device (act 164). Finally, at an appropriate time, the coordinator may pay the carrier (acts 166, 168) and may charge the user of the client device (acts 166, 170). The collection and payment may be simultaneous or separated in time.

Figure 5:
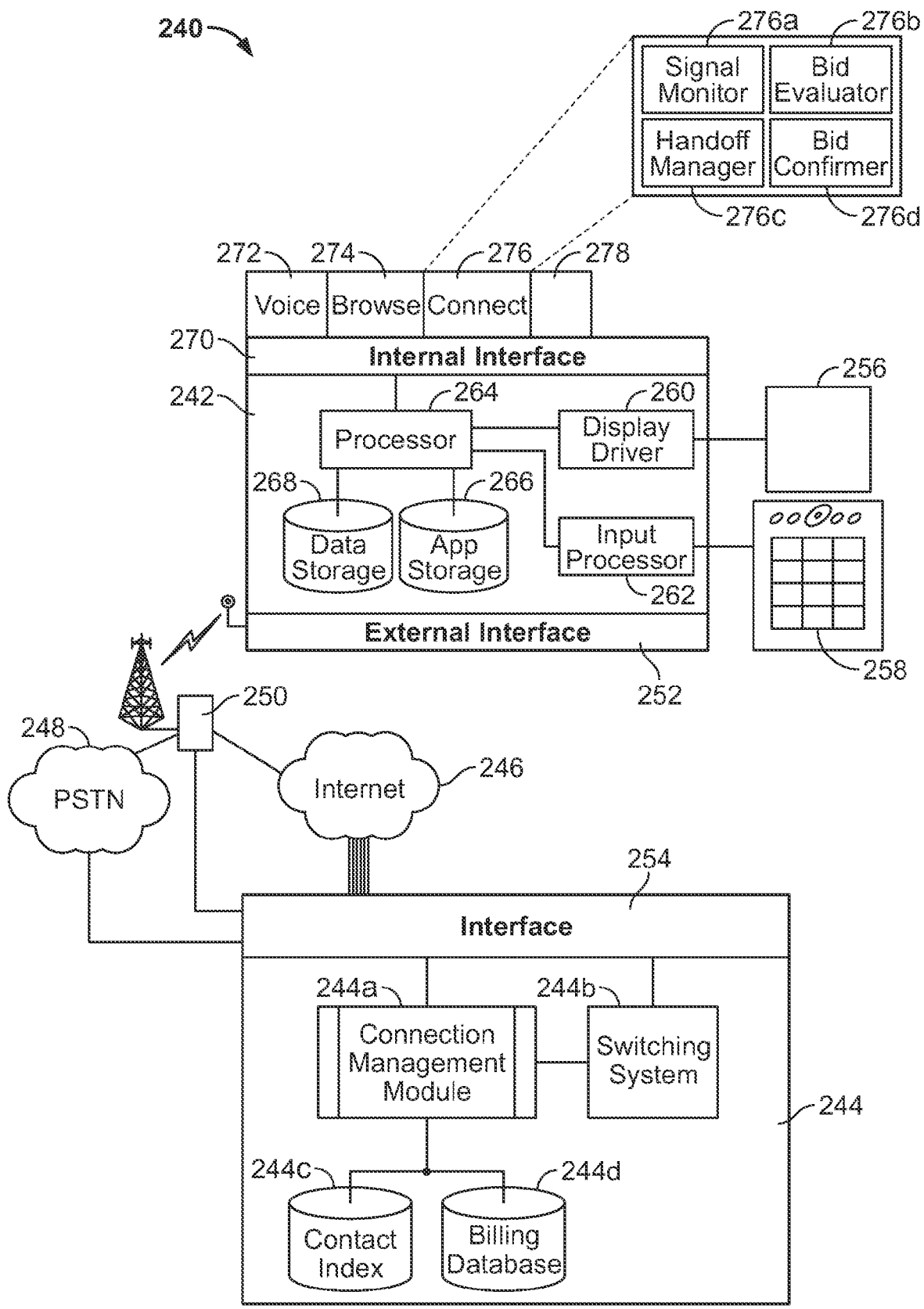
FIG. 5 is a block diagram showing the components of a wireless communication device and a system for coordinating communication session with the device.

FIG. 5 is a block diagram showing the components of a wireless communication device 240 and a system for coordinating communication sessions with the device 240. The device 240 is designed as a modular and open communication device. All data transmitted by the device 240 is converted to the appropriate interface based on the current transmission mode of the device. Various applications may be arranged above the communication layer, so that their data is transformed to the common format before being transmitted. For example, for a voice call, an ND converter may convert the voice signal to a digital representation, and another layer may convert that digital signal to a packetized signal that may be transmitted wirelessly, such as by an IEEE 802.11 standard.

The device 240 centers around a programmable processor 264, that may receive input from a user through, for example, a keypad 258 and input processor 262 or other input mechanism such as a voice recognition module. The processor 264 may deliver output through display driver 260 to a display 256, such as a standard TFT color flat graphical LCD display, OLED display, or other output mechanism such as an audio speaker.

The processor 264 may also draw on and store various forms of data. As one example, the device 240 may be provided with application storage 266, where data for an operating system and applications that run on top of the operating system may be stored. For example, a user of the device 240 may load a number of communication and/or productivity programs on the device 240. The operating system may be flexible and open-source so as to permit more ready development of applications. In addition, data storage 268 may be provided to maintain data needed by the operating system and the applications. For example, data storage 268 may contain contacts information for an organizer application, web data for an internet browser application, and other similar data. Storage 266, 268 may be in any appropriate form, including ROM, RAM, Flash memory, disk-based storage, or a combination of these or other storage mechanisms as described more fully below. The application data and other data may be stored in a common storage or split across multiple storage structures.

An internal interface 270 provides a basis on which various modules, which may be in the form of executable or other applications, can run. The internal interface 270 may be a part of an operating system to run on the device, and may include various components such as a kernel, video controller, memory manager, networking, file management, etc. Examples of such parts include Windows Mobile, Linux, Java, Symbian, and simple real-time operating systems for phones.

A voice module 272 may be one of the applications operating on device 240. The voice module 272 may provide for telephony functionality in a generally known manner. The module 272, for example, may provide for interaction with an organizer application so as to retrieve telephone identification information, and may then generate appropriate signals for creating a telephone call. The module 272 may also instigate telephone calls based on a click-to-call link in a displayed document, such as a web page.

The voice application may be implemented as a traditional voice service, whether analog or digital, or a VoIP service. In addition, device 240 may have a voice module 272 equipped for both modes of providing voice service, such as for use when the device 240 is in-network and is out-of-network. The voice application may be operated wholly in software, and may also in appropriate circumstances use hardware in addition to that shown, such as ND and D/A converters.

A browser module 274 may permit for the display of information sent and received over the internet using Hypertext Transfer Protocol (HTTP) or other similar technologies. The browser module 274 may provide for basic and advanced World Wide Web activity, as is well known in the art. For example, the browser may display web pages authored in HTML, WML, xHTML, iMode, and other formats. Certain features in web documents, such as click-to-call links, may cause browser module 274 to interact with voice module 272.

A connection module 276 may also be provided, and may be at the same logical level as the other modules, or at a lower level of the system. The connection module 276 may generally be programmed and configured to manage external communications for the device, including by the processes discussed above and below. Among other things, the connection module 276 may have a signal monitor 276a which may identify the available signals in a particular area at particular frequencies or bands of frequencies, and the potential quality of those signals, such as for determine which carrier to select for a communication session. The connection module 276 may also be configured to determine the approximate strength of those signals. For example, the signal monitor 276a that may be part of connection module 276 may identify the presence of a WiFi network in the vicinity, along with a WiMax and GSM network. The signal monitor 276a may also identify the provider of the particular signal, such as through a predetermined identification protocol.

Handoff manager 276c may work with signal monitor 276a to help coordinate a handoff from one access point, or cell, to another, from one network to another, and/or from one mode to another. For example, as signal monitor 276a senses signal strength and senses that the signal strength of its currently locked-in access point is weakening, while signal strength from other access points is strong, the device 240 may begin a handoff process or may send information to one or more of the access points so that they begin a handoff process.

The handoff manager 276c may be configured to switch between modes of communication for the device, and to do so in a soft manner. For example, the handoff manager 276c may simultaneously receive data over both channels and may select only one channel to pass to, for example, the voice module 272. When the strength of a second mode is high enough as measured by the signal monitor 276a, the device 240 may switch over entirely to that mode. Where soft handoffs are not possible, such as where the two modes use different networks that cannot simultaneously carry the same signal, a hard hand off may be used. In addition, buffering of data may also be used to make a hard handoff more transparent.

In particular circumstances, connection module 276 may include a bid evaluator 276b and a bid confirmer 276c. The bid evaluator 276b may receive bids submitted by potential carriers, and may be programmed with rules or other logic for selecting a carrier based at least in part on the bids. The bid confirmer 276c may receive a carrier selection from the bid evaluator 276b and may carry out the necessary steps to ensure that a communication session is established with that carrier. The bid confirmer 276c may also help to confirm the existence of a communication session after-the-fact, such as when a coordinator attempts to verify the session.

Another module may be a custom module 278, which may include, for example, third-party programs loaded by a user onto device 240. The device 240 may be configured in such a way so as to have an API with which various programs or applications may communicate. As a result, many different programs or applications may be made available for the device 240, so as to provide a user of device 240 with maximum flexibility at a reasonable cost. For example, just as applications may be written easily to operate with a web browser, applications may also be written easily to work with device 240. These applications could include unique or custom messaging systems.

One or more of the modules or other components of device 240 may be loaded onto device 240, such as through an on-line download. Also, one or more modules or other components may be loaded on a removable media that is coupled to the device, such as a Subscriber Identity Module (SIM) card, or by other mechanism, such as a removable flash module. Such downloaded programs or applications or removable devices may be provided with appropriate security mechanisms to help ensure that inappropriate users of a device cannot easily use the device, or change the identity of a device.

As thus described, device 240 may provide its user with a number of advantages. For example, device 240 may be used as a universal communicator because all communications are treated similarly as simple packetized data communications. Also, device 240 may be provided essentially as an open-source device for which various developers can provide customized solutions. For example, if there is demand for a particular type of communication device, a company may provide it and need only worry about making the packets of data that come out of the device conform to a common standard. Particular operations of the device may be irrelevant to the network itself, as the system may follow standard layered abstraction techniques.

In addition, users may segment their use of device 240 more efficiently—using pay-for-service only when necessary, and matching the price and level of service to their particular needs. For example, if a user does not need to use a device far away from their home very often, they need not pay for such use. Finally, the device 240 may allow more ready convergence of functions in a single device. Specifically, by treating all communications as data communications, device 240 may contain a single common communications engine, with a number of applications layered on top of that engine.

Device 240 may communicate with various networks via external interface 252, which may be a multi-modal wireless interface. Separately, a telecommunications coordinator 244 is shown, and may communicate with a wireless transmission system 250 and other similar systems via internet 246 and PSTN 258. The wireless transmission system 250 may comprise a private network, such as one owned and controlled by the owner of coordinator 244. The system 250 may also be a traditional cellular telephone system or a more advanced system such as a 3G system.

The coordinator 244 may include a switching system 244*b* so that communication sessions within the network served by the coordinator 244 may be properly routed. The switching system 244*b* may also be distributed out through the network, and managed by the coordinator 244. The coordinator 244 may also contain a connection management module 244*a* that helps provide connections for users seeking to have a communication session, as described more fully above, and also helps to track and permit billing for such sessions.

The connection management module 244*a* may communicate with the switching system 244*b* to help make appropriate connections or produce appropriate routing of messages. In addition, the connection management module 244*a* may draw upon a contact index 244*c*, which contains connection information for subscribers of coordinator 244. such information may include identification information such as user names, telephone numbers, and IP addresses. In addition, connection management module 244*a* may store information about the costs of communication sessions in a billing database 244*d*. This information may be used, as described above to update account balances and carry out payments for the carrying of communication sessions.

Figure 6:
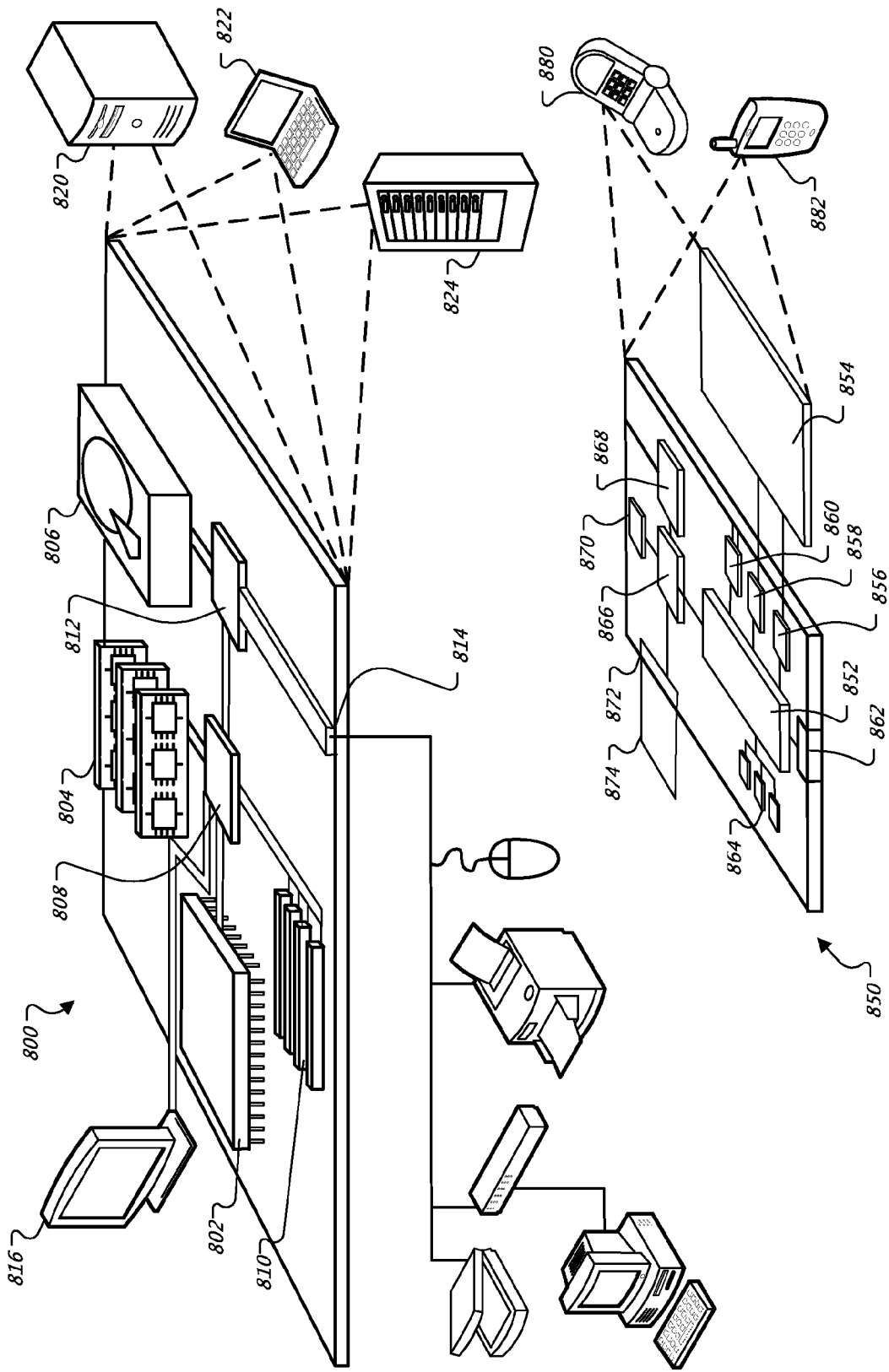
FIG. 6 is a block diagram of computing devices that may be used to implement the systems and methods described in this document.

FIG. 6 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

A number of embodiments have been described. Nevertheless, it will be understood that various modifications may be made without departing from the spirit and scope of the described embodiments. Accordingly, other embodiments are within the scope of the following claims.

What is claimed is:

1. A computer-implemented method comprising:
   receiving, at a computing device, input that indicates a request to transmit information from the computing device to another device;
   obtaining, by the computing device and in response to receiving the input, bids from available network providers to transmit the information, wherein the available network providers are able to communicate with the computing device at the computing device's current physical location;
   selecting, by the computing device one of the available network providers to transmit the information based on the obtained bids; and
   initiating, by the computing device, a communication session with the selected one of the available network providers to transmit the information originating from the computing device to the other device.

2. The method of claim 1, wherein the available network providers include one or more data communication providers that transmit data over one or more data networks.

3. The method of claim 2, wherein the one or more data communication providers include one or more Internet service providers, and the one or more data networks include the Internet.

4. The method of claim 1, wherein the available network providers include one or more telecommunication service providers that transmit audio signals over one or more telecommunication networks.

5. The method of claim 1, wherein the available network providers are associated with a heterogeneous group of communication networks comprising a first type of communication network and a second type of communication network that is different than the first type of communication network.

6. The method of claim 1, wherein the information comprises data to be transmitted to the other device during the communication session.

7. The method of claim 1, wherein the information comprises an audio signal or a video signal to be transmitted to the other device during the communication session.

8. The method of claim 1, wherein the other device comprises another computing device that is identified by a unique identifier associated with the other computing device.

9. The method of claim 8, wherein the unique identifier comprises an Internet protocol (IP) address or a username associated with the other computing device.

10. The method of claim 1, wherein the other device comprises a landline telephone, a cellphone, or a smartphone that is identified by a telephone number.

11. The method of claim 1, wherein a communication path between the computing device and the other device that is provided by a first available network provider includes a plurality of segments, wherein a first bid from the first available network provider comprises a price for transmitting the information along the communication path and including the plurality of segments.

12. The method of claim 11, wherein at least a portion of the plurality of segments are controlled by one or more other network providers, and wherein the price includes fees charged by the one or more other network providers for the at least a portion of the plurality of segments.

13. The method of claim 1, wherein the one of the available network providers is selected additionally based on one or more quality indicators associated with communication services provided by the available network providers.

14. The method of claim 13, wherein the one or more quality indicators include one or more of: currently available bandwidth, maximum bandwidth, zone of coverage for one or more corresponding wireless access points, and signal strength for the one or more corresponding wireless access points.

15. The method of claim 1, wherein at least a portion of the bids are for use of one or more networks corresponding to one or more of the available network providers for a period of time.

16. The method of claim 1, wherein at least a portion of the bids are for transmission of up to a threshold amount of information across one or more networks corresponding to one or more of the available network providers.

17. The method of claim 1, further comprising providing, to a plurality of network providers, parameters for transmitting the information to the other device, wherein the available network providers comprise at least a portion of the plurality of network providers, and wherein the parameters include one or more of: a type of information to be transmitted, an amount of information to be transmitted, and a minimum bandwidth for transmitting the information;
   wherein the obtained bids are for transmitting the information consistent with the parameters.

18. A computing device comprising:
- an input processor to receive input that indicates a request to transmit information from the computing device to another device;
- a connection module to, in response to receiving the input, obtain bids at the computing device from available network providers to transmit the information, wherein the available network providers are able to communicate with the computing device at the computing device's current physical location;
- a bid evaluator to select one of the available network providers to transmit the information based on the obtained bids; and
- an interface to initiate a communication session with the selected one of the available network providers to transmit the information from the computing device to the other device.

19. The system of claim 18, wherein the available network providers include one or more data communication providers that transmit data over one or more data networks.

20. The system of claim 18, wherein the available network providers include one or more telecommunication service providers that transmit audio signals over one or more telecommunication networks.

21. The system of claim 18, wherein the available network providers are associated with a heterogeneous group of communication networks comprising a first type of communication network and a second type of communication network that is different than the first type of communication network.

22. The system of claim 18, wherein the information comprises data to be transmitted to the other device during the communication session.

23. The system of claim 18, wherein the information comprises an audio signal or a video signal to be transmitted to the other device during the communication session.

24. The system of claim 18, wherein a communication path between the computing device and the other device that is provided by a first available network provider includes a plurality of segments, wherein a first bid from the first available network provider comprises a price for transmitting the information along the communication path and including the plurality of segments.

25. The system of claim 24, wherein at least a portion of the plurality of segments are controlled by one or more other network providers, and wherein the price includes fees charged by the one or more other network providers for the at least a portion of the plurality of segments.

26. A computer program product embodied in a computer-readable storage device including instructions that, when executed, cause one or more computer processors to perform operations comprising:
- receiving, at a computing device, input that indicates a request to transmit information from the computing device to another device;
- obtaining, by the computing device and in response to receiving the input, bids from available network providers to transmit the information, wherein the available network providers are able to communicate with the computing device at the computing device's current physical location;
- selecting, by the computing device one of the available network providers to transmit the information based on the obtained bids; and
- initiating, by the computing device, a communication session with the selected one of the available network providers to transmit the information originating from the computing device to the other device.

* * * * *

UNITED STATES PATENT AND TRADEMARK OFFICE
CERTIFICATE OF CORRECTION

PATENT NO. : 8,379,828 B2  Page 1 of 1
APPLICATION NO. : 13/234834
DATED : February 19, 2013
INVENTOR(S) : Shumeet Baluja et al.

It is certified that error appears in the above-identified patent and that said Letters Patent is hereby corrected as shown below:

In the Claims,

Column 25, line 17, in Claim 19, delete "system" and insert -- computing device --, therefor.

Column 25, line 20, in Claim 20, delete "system" and insert -- computing device --, therefor.

Column 25, line 24, in Claim 21, delete "system" and insert -- computing device --, therefor.

Column 25, line 29, in Claim 22, delete "system" and insert -- computing device --, therefor.

Column 25, line 32, in Claim 23, delete "system" and insert -- computing device --, therefor.

Column 26, line 1, in Claim 24, delete "system" and insert -- computing device --, therefor.

Column 26, line 8, in Claim 25, delete "system" and insert -- computing device --, therefor.

Signed and Sealed this
Fourth Day of June, 2013

Teresa Stanek Rea
*Acting Director of the United States Patent and Trademark Office*